United States Patent [19]
Lee

[11] Patent Number: 5,016,974
[45] Date of Patent: May 21, 1991

[54] SPIN INITIALIZATION PROCEDURE

[75] Inventor: Charles Lee, deceased, late of Berkely Hgts., N.J., by Marjorie Lee, administrator

[73] Assignee: Photon Imaging Corp., Edison, N.J.

[21] Appl. No.: 335,196

[22] Filed: Apr. 7, 1989

[51] Int. Cl.$^5$ .............................................. G02B 6/04
[52] U.S. Cl. ............................. 350/96.24; 350/96.25
[58] Field of Search ......................... 350/96.24, 96.25; 250/227

[56] References Cited

U.S. PATENT DOCUMENTS

| | | | |
|---|---|---|---|
| 3,836,911 | 9/1974 | Gibson et al. | 350/96.24 |
| 4,674,834 | 6/1987 | Margolin | 250/227 |
| 4,762,391 | 8/1988 | Margolin | 350/96.25 |

Primary Examiner—William L. Sikes
Assistant Examiner—Robert E. Wise
Attorney, Agent, or Firm—Herbert M. Shapiro

[57] ABSTRACT

An image scanner employing a fiber optic bundle extending from a linear entrance face to an area exit face and having an analog sensor array coupled to the exit face is initialized by a procedure which selects a subset of sensors of the array in a sequence to match the sequence of pixels in the entrance face even if the bundle is noncoherent. The initialization procedure is operative to select candidate sensors during a windowing operation and to sort the successful candidates into a proper sequence simultaneoulsy by exposure of the sensors to light of different durations which are a function of a multistage spinning pattern of transparent and opaque areas. The sequence of sensors obtained corresponds to the sequence of pixels in the linear entrance face.

10 Claims, 5 Drawing Sheets

SPIN INITIALIZATION PROCEDURE

FIELD OF THE INVENTION

This invention relates to a scanner employing light pipes such as optical fibers, and more particularly to the apparatus and procedure for initializing such a scanner.

BACKGROUND OF THE INVENTION

U.S. Pat. No. 4,674,834 issued June 23, 1987, discloses a page scanner employing a noncoherent fiber optic bundle in which fibers extend from a linear entrance field to a rectangular exit field. The bundle is called "noncoherent" because there is no established or predetermined relationship between the ends of the fibers in the exit field and the corresponding ends of the fibers in the entrance field. The rectangular exit field is coupled to a corresponding photo-sensor array having a significantly larger number of sensors compared to the number of fibers.

The determination of a sequence of sensors of the sensor array to correspond to the sequence of fiber ends (viz: pixels) in the entrance field is carried out electronically. This determination is made during an initialization procedure where the exit field is imaged onto an array of discrete sensors and a light slit is moved along the entrance field in a manner to establish a lookup table for a subset of the sensors of the array which corresponds to the sequence of pixels in the entrance field. Thus, the lookup table organizes the electronic signals exiting the sensor array to match the organization of pixels in the entrance field.

U.S. Pat. No. 4,762,391 issued Aug. 9, 1988 disclosed one initialization procedure for such a scanner. The procedure employs a light slit which is moved incrementally along the entrance field of the bundle. The sensor array is read out for each slit position and a computer algorithm selects a representative sensor address for each of the sequence of pixels. The procedure requires several minutes to complete. Although in production a fairly large number of scanners can be initialized at the same time, thus reducing the average time required for an initialization procedure, it is desirable to reduce the time required for a single scanner as much as possible.

STATEMENT OF THE INVENTION

The present invention is directed at an initialization procedure which employs a transparent tube having defined on it stages of different opaque patterns which are aligned with the axis of the tube. The linear face of a fiber optic bundle is juxtaposed with the face of the tube and also aligned with he axis and exposed to light originating along the axis of the tube. The tube is rotated and sensors located at the opposite face of the bundle are interrogated at each stage of the pattern. The multistage pattern is designed so that the set of data obtained by a succession of interrogations of the sensors determines the relationship between the ends of the fibers in the two faces.

BRIEF DESCRIPTION OF AN ILLUSTRATIVE EMBODIMENT OF THIS INVENTION

In accordance with the principle of the present invention, a fast initialization procedure is provided for analog sensor arrays such as charge coupled devices or charge injection devices. The procedure employs a pattern of light and dark regions formed on a flexible planar medium which can be rolled into a tube. In practice, the medium is transparent to light with the pattern being opaque (black).

In the preferred embodiment, the medium is rolled into a tube and spun about an axis. An elongated lamp is placed along the axis of the tube and the scanners to be initialized are positioned adjacent to the periphery of the tube extending outward radially with the linear field being aligned with the axis and abutting the tube.

The pattern on the medium is of a special design to qualify sensors and to select sensors in a sequence to correspond to the sequence of pixels in the entrance field. The qualification and sequencing are obtained by directing light patterns at a scanner entrance field in a manner such that the intensities (exposure times) at each significant sensor of the sensor array differs in a predictable fashion during the entire integration time for the sensor array coupled to the exit field of that scanner. The light patterns are formed in stages of increasing resolution to move the exposure time distributions so that successive significant "positioning" bits can be associated with individual sensors of the array for sequential placement in a look-up table.

In one embodiment, each stage of a multistage pattern comprises triangular opaque regions where a straight edge interface between each opaque triangle and its surrounding transparent area is oriented at an angle to the direction in which the tube spins. The sensors of the photosensor array are turned on while the pattern of a stage passes the linear face of the scanner being initialized. The sensors are turned off between stages so that the exposure time ends as a function of the pattern but starts simultaneously for all sensors.

The pattern of the first stage includes a single opaque triangle with an edge extending the length of the linear face and at an angle to it. The linear edge is illuminated through the transparent area as the tube spins. The light flux incident on the various sensors illuminated (via the fibers) varies according to the length of the transparent area aligned with the incremental section of the triangle corresponding to the position of the fiber in the linear face of the fiber optic bundle through which the particular sensor is illuminated.

The triangular pattern in each of the consecutive stages is different, each successive stage having an increasing number of triangles with steeper edges. Each stage, in turn, provides coded bits representative of the distribution of the exposure times. Four stages provide twelve coded bits, sufficient to encode 4096 sensors. Those (position) codes are stored in a look-up table along with addresses of the sensors exposed to the exposure time history represented by those bits.

Each stage of the pattern includes two substages in which identical patterns of triangles are spatially offset from one another to avoid ambiguities which could occur at sensors associated with fiber ends in the linear entrance field in positions to correspond to a point of a triangle in the pattern.

The pattern also may include timing marks to turn off the sensor array between stages so that data can be moved from the array into a buffer memory emptying the array for the next exposure. Alternatively, the array may be turned on and off by synchronizing electronic control circuitry. Such circuitry may be adapted, to strobe the illuminating lamp for example. In any case, the entire initialization procedure is carried out during one rotation of the tube. At a practical rate of 10.0 millisecond per stage, all initializing data for placing the sensors of the array in a sequence which corresponds to the sequence of pixels in the linear face, is obtained in a fraction of a second.

The high speed of initialization is obtained because the tube is spinning and all pertinent sensors (illuminated via the fiber bundle) are encoded simultaneously with corresponding coded representation of their flux intensity exposure histories which depends on the position of the fiber through which it is illuminated with respect to the pattern used.

A number of scanners can be initialized simultaneously by positioning a plurality of scanners at different positions about the periphery of the spinning tube. The sensor array of each scanner can be initialized independently, the procedure creating a look-up table which is unique for each scanner.

DETAILED DESCRIPTION OF ILLUSTRATIVE EMBODIMENTS OF THE INVENTION

One objective of the initialization procedure is to eliminate defective sensors of an analog photosensor array such as a charge injection device (CID) or a charge coupled device (CCD) organized on a random access basis. Another objective is to establish a mapping (look-up) table between fiber ends at the linear port (entrance field) and the sensors at the array port (exit field). The initialization procedure consists of two steps. The first step is the windowing; the second step is the sorting.

The objective of windowing is to eliminate any defective sensors as candidates for the look-up table and to establish the compensation coefficients table so that during subsequent sorting steps the analog output of (say) the CID can be trusted with a defined range. The objective of the sorting step is to establish the sequence of pixel data exiting the sensor array at the array port to correspond to the sequence of pixels in the entrance field. The merit of the initialization algorithm is the duration of the time it takes to do the initialization.

Figure 1:
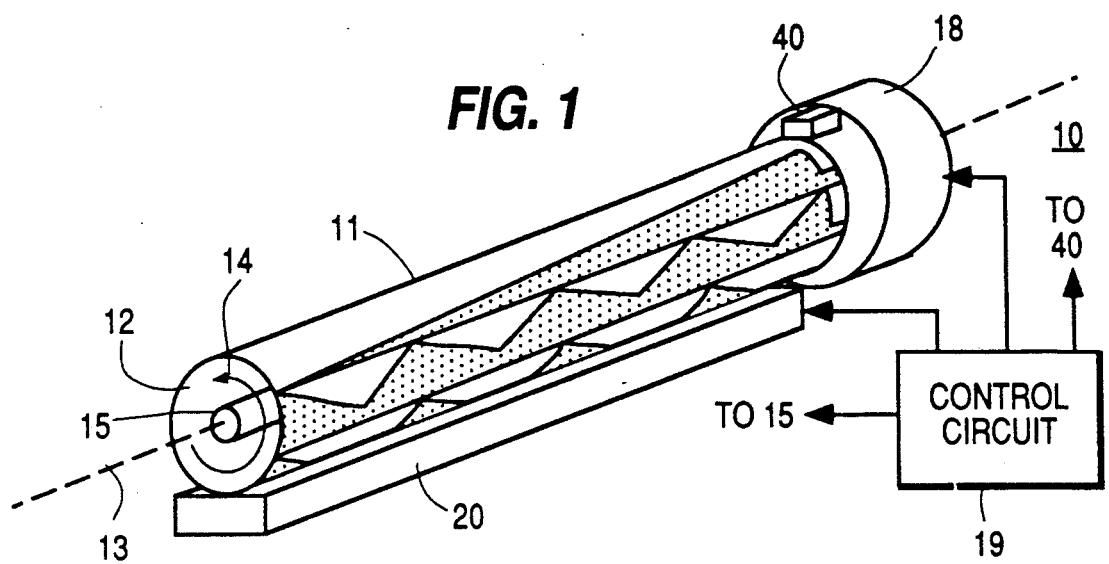
FIG. 1 is a schematic representation of initialization apparatus in accordance with the principles of this invention.

The apparatus for the initialization procedure is a spinning tube about 10"long with a patterned transparent foil forming the tube. An elongated light source is positioned along the center axis of the tube. The apparatus 10 is illustrated in FIG. 1. The patterned foil is shown at 11, forming a tube 12 with a center axis 13. The tube is spun counterclockwise as indicated by curved arrow 14. Light source 15 is positioned along axis 13.

Tube 11 is spun by motor 18 under control of control circuit 19. Circuit 19 also controls the lamp 15. A scanner 20 to be initialized, is positioned, entrance field (linear end) facing axis 13 at the face of tube 11 as shown. Control circuit 19 also controls the read out of a sensor array which is considered part of scanner 20.

Figure 2:
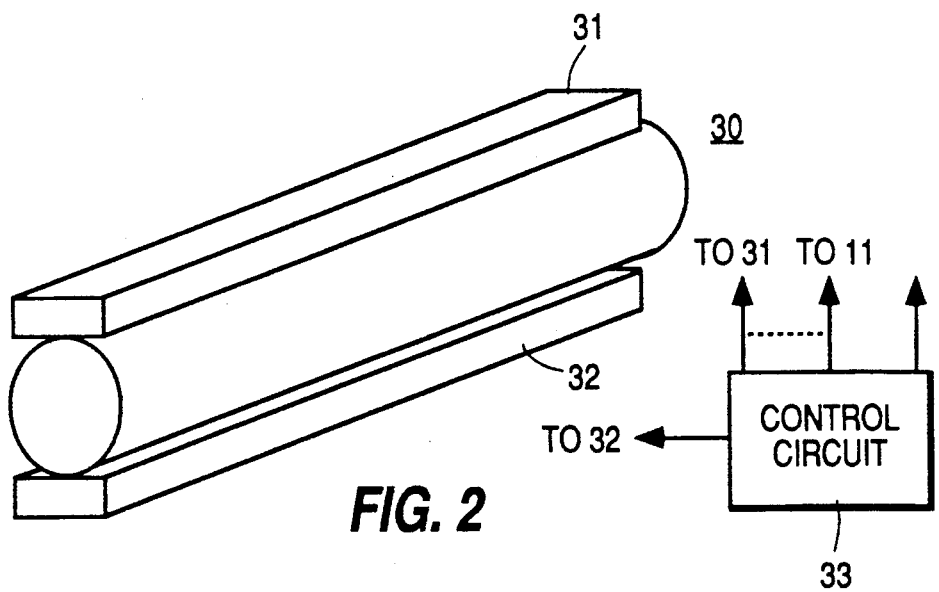
FIG. 2 is a schematic representation of initialization apparatus of FIG. 1 used for a plurality of scanners simultaneously in accordance with the principles of this invention.

FIG. 2 shows an apparatus 30 identical with that shown in FIG. 1 except that a multiple number of scan heads (31, 32 - - - N) are mounted so that their linear entrance faces abut the tube and their photosensors are illuminated through the patterned foil and through their respective fiber optic bundles. The patterned foil is a transparent film (i.e. photographic) with totally opaque patterns. The light source is a long ($\sim 10''$) fluorescent tube the intensity of which is chosen so that the signal from the sensor array is slightly below the saturation level.

The initialization procedure consists of spinning the patterned cylindrical foil at a properly chosen speed,. ($\sim 600$ rpm) exposing the array through the patterned foil, reading the data collected by the array, and performing data analysis. Along the edge of the pattern foil, there may be a timing mark pattern, which is a linear sequence of clear regions and opaque regions. This timing pattern is read by a photo-chopper 40 under the control of control circuit 19 of FIG. 1 or 33 of FIG. 2. The signal is used to control the integration (about 10 ms) and data shift (about 1 ms) duration of the sensor array.

Figure 3:
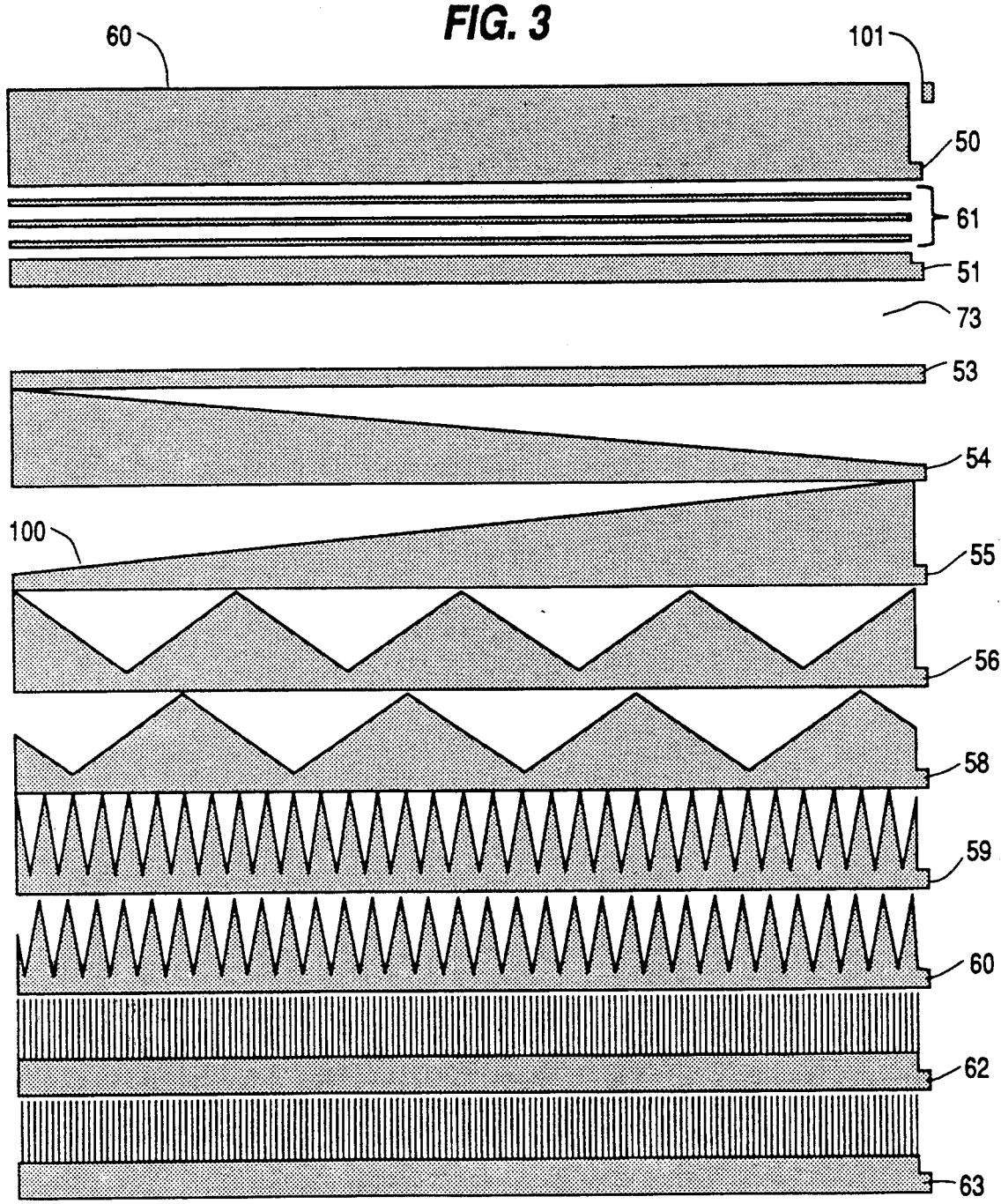
FIG. 3 is a computer printout of a pattern useful in the apparatus of FIGS. 1 or 2.

FIG. 3 shows an illustrative pattern for tube 11 of FIG. 1. The pattern shows timing marks 50, 51, 53, 54, 55, 56, 58, 59, 60, 62, and 63. These marks are operative to turn off the sensor array for a prescribed predetermined period in each instance. The pattern is divided into stages indicated by the timing marks as will become clear. During each stage, the sensors of the scanner (20 of FIG. 1) are exposed to light via the fibers. The exposure differs in a predictable way as a function of the pattern in each stage.

The windowing step uses the windowing patterns as shown in FIG. 3. The windowing patterns illustratively consist of three stages. The all dark pattern 70 is used to check the uniformity of the dark level response of all sensors; the 50% pattern 71 is used to check the linearity of the sensors and the all white pattern 73 is used to check the uniformity of the sensor signals during the white level. After each of these windowing patterns is spun across the scan head during the integration (array-on) period, photons are sensed by the sensors. During the shift period, data are read out from an A/D converter considered to be included in scanner 20. The average value of the signals is calculated by computer software imbedded in control circuit 19 also. Any sensor whose readout is not within (an arbitrarily determined) 12.5% of the average value is marked to be rejected as a candidate. After all three windowing patterns are processed, the remaining selected sensors can be trusted with a 3-bit accuracy ($\frac{1}{8}$ of full scale resolution) over the sensor dynamic range.

The non-uniformity of the sensors and the fibers could make it difficult to select sensors with 12.5% data output uniformity. Although this is not likely, if this is found to be the case, an attenuation compensation scheme using a compensation table would be used. In this compensation scheme, a pre-selection of the sensors is made based on a very relaxed uniformity criteria. Only the sensors that are grossly out of range (say 50%) are rejected. Then, for each of the selected sensors, the required amplification gain, in order to bring its output with the 12.5% uniformity, is measured using the three windowing patterns. The gain is recorded in the form $G = G_o + G_1 \cdot I + G_2 \cdot I^2$. The collection of these required amplification gains is the compensation coefficient table.

After this compensation table is constructed, any further reading of each sensor is multiplied by its corresponding amplification gain. Using this scheme, it is possible to compensate to the limit of the uniformity of the light source. To minimize the non-uniformity of the light source, the fluorescent tube is driven by a high frequency AC current whose frequency has no harmonic relation with 60 Hz stray magnetic fields to avoid any standing wave or slowly drifting travelling wave along the tube.

It is also worthwhile to note that the compensation table collected during the windowing step can later be used as a built-in compensation in the scanner initialized.

Figure 4:
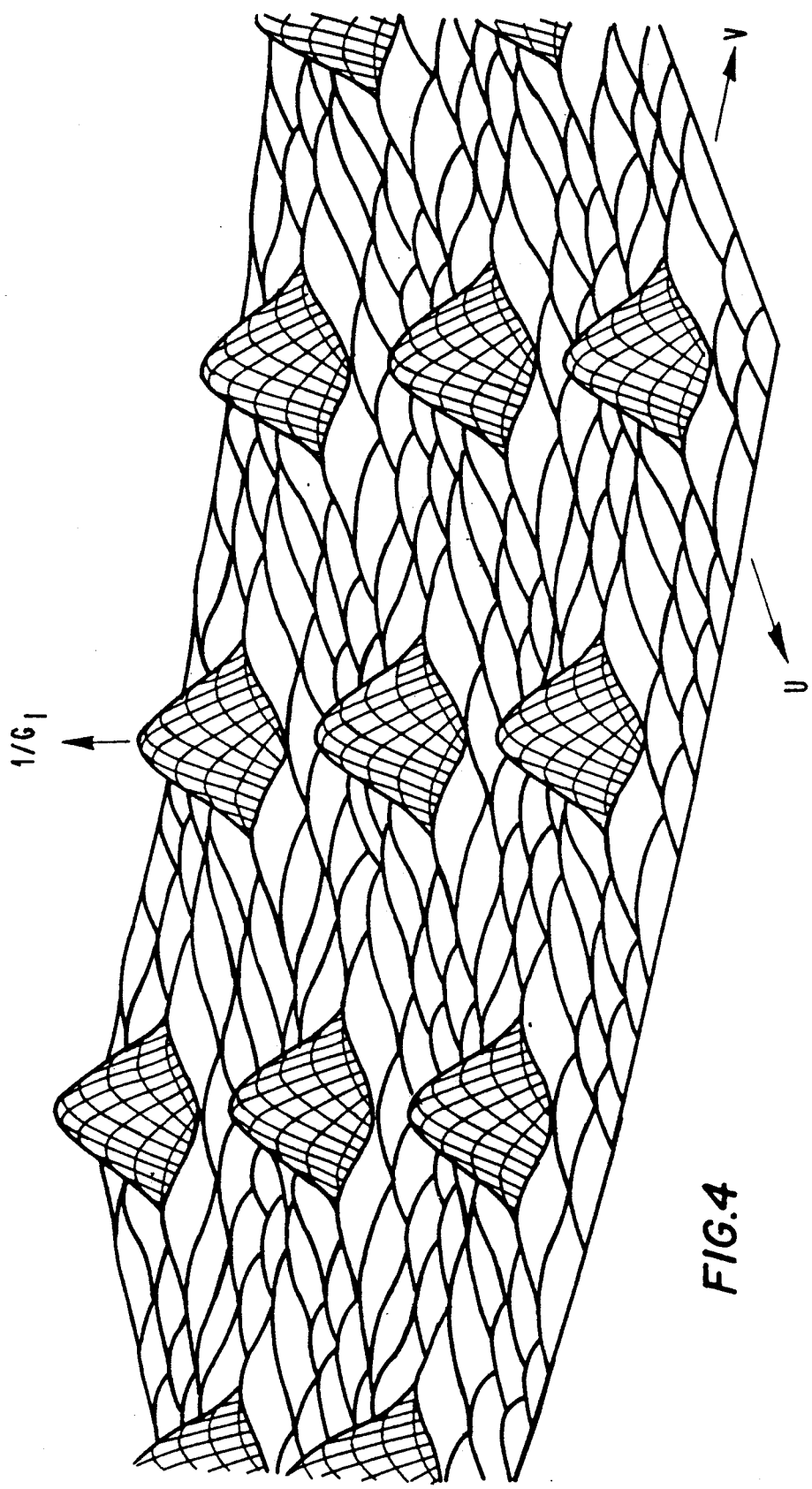
FIG. 4 is a computer representation of the distribution of sensor positions as a function of light intensity during the initialization procedure in accordance with the principles of this invention.

After the data collection of the windowing step is completed, the controlling computer (control circuit 19) arranges the collected $G_1$ coefficients of all sensors into a 2-dimensional array exactly the same way these sensors are arranged in the sensor array. We will observe that these $G_1$ coefficients form a 2-dimensional array of hemispheres like the surface of a fly's eye as shown in FIG. 4. The computer software selects the sensors whose $1/G_1$ value is locally the highest. These sensors are the sensors sitting at the apex of these hemispheres. These selected sensors are the sensors whose position relative to the fiber end in the exit field is optimized and receive the maximum amount of light flux. The number of selected sensors at this moment equals the number of fibers. If there is an area of 2.5 mil diameter (the diameter of fibers in an illustrative 400 dot per inch (dpi) scanner), within which, all cells have very high value of $G_1$, we know it is an area facing a broken fiber. We then mark these cells as rejected and we do not select the apex of this hemisphere.

When the windowing process is completed, we have selected a number of apex sensors equal to the number of un-broken fibers. For each of these selected sensors, we have also collected its compensation coefficients: $G_o$, $G_1$, $G_2$. The next step is the sorting step.

The sorting step is operative to place the sensors of the sensor array in a proper sequence so that the sequence of pixel data from the sensor array corresponds to the sequence of pixels at the linear end of the scanner. The sorting step uses the sorting patterns which are shown in FIG. 3.

Figure 5:
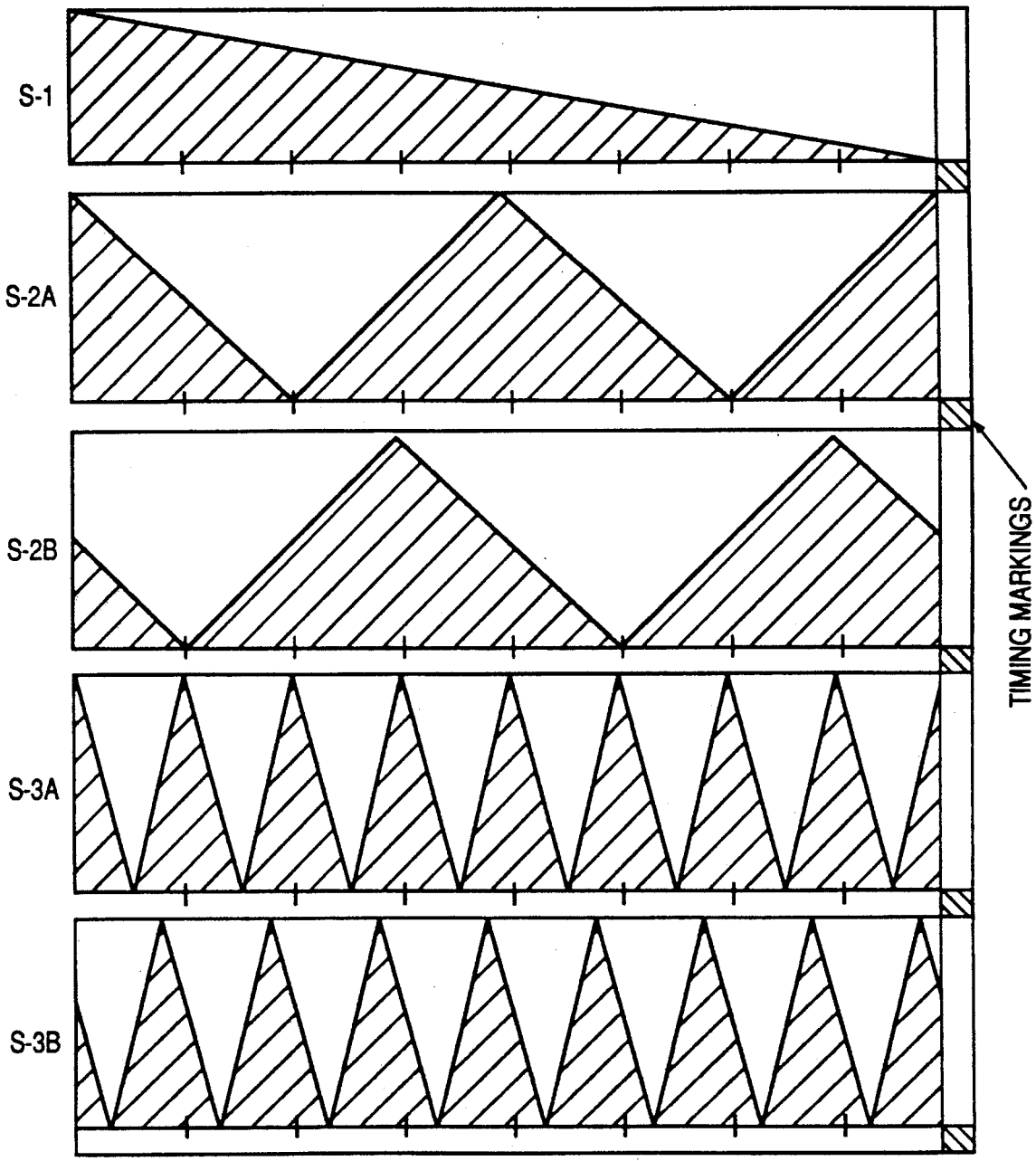
FIG. 5 is a schematic representation of a portion of the pattern of FIG. 3.

FIG. 5 shows the stages of the pattern of FIG. 3 used for sorting. Three stages are shown and the pattern in each stage is referred to by its stage number. The first sorting pattern to be spun across the scanner is the S-1 pattern. The leftmost fiber and its apex sensor receive the least amount of light, the right most fiber and its apex sensor receive the most amount of light, during the integration time (i.e., the time the sensor in on). The selected sensor data are collected during the shift time when the timing mark is operative to turn off the array. These data are stored in an array of "C" structures as shown below:

```
struc cell {
    int a; /* Intensity data a */
    int b; /* Intensity data b */
    char order;  /* 1 = Ascending order */
                 /* 0 = Descending order */
    float G0; /* Compensation coefficients */
    float G1;
    float G2;
    int x; /* cell address */
    int y;
} *data[N]; /* N = # of unbroken fibers */
```

During the integration of the S-1 pattern, all data are stored according to intensity data.a. A modified bubble sort is then carried out based on the values stored in data.a. This modified bubble sort is different from the traditional bubble sort in that the pair exchange are done between cells whose indexes are spaced by N/8. This is because we have accepted a compensation coefficient of 12.5% accuracy.

At the end of the bubble sorting process that uses the S-1 pattern, the data [N] is long-range in order, but short-range random. The resolution is 3 bits.

Next, we collect photo-charge data for the sensors of the sensor array using patterns S-2A and S-2B (for stage S-2 (A and B)). Pattern S-2A and S-2B have spatial frequency 4 times higher than pattern S-1. It therefore can resolve sensor positions with an accuracy of 2 additional bits. Pattern S-2B is 90 degrees phase shifted relative to pattern S-2A. The reason for using two patterns with 90 degrees phase shift is that for illustrative purposes we do not accept any data within 25% to the dark level or within 25% to the white level. If the value of data.a. is within 25% to the dark level or the white level, we use data.b. in carrying out the bubble sort. In other words, we always use the middle 50% of the dynamic range in sorting. When sorting the S-2 data, pair exchanges are done between sensors whose indexes are spaced by N/32. Note $32 = 2(3+2)$. Remember that each finer pattern provides two additional bits of accuracy.

Next, we sort the cells using pattern S-3A and S-3B (for stage S-3 (A and B)) the spatial frequency of which is again 4 times higher than pattern S-2A and S-2B. FIGS. 3 illustrates what the patterns of subsequent stages look like.

These processes continue recursively until pattern S-6A and S-6B (not shown) are finished. At that time, the array data[N] is totally in order and the coherency of the fiber FAN is established.

Since we use 3 windowing patterns (60, 61, and 73 of FIG. 3) and 11 sorting patterns, the total number of patterns is 14, although only 11 (including the windowing patterns) are actually shown in FIG. 3. Assuming we spend 10 ms for each pattern, the total data collection time is 140 ms. This time is so short that the initialization time will be primarily limited by the mechanical loading and unloading and the CPU processing time. The current estimation of the total time required for initialization in production is a few seconds.

An analog sensor array useful in accordance with this invention includes internally generated timing signals to control the operation of the array to determine when the sensors integrate the incident light flux and when to shift the data representative of the incident light flux for each sensor of the array. During an initialization procedure in accordance with the principles of this invention, this normal sequence is interrupted. Control circuit 19 of FIG. 1 (or 33 of FIG. 2) are considered to include such interrupt circuitry. Instead, a light chopper (see 40 of FIG. 1) is employed. Such a chopper is commercially available and includes an LED-photodetector pair with a slot between them in which the timing marks move. In normal scanner operation the interrupt circuit is not present and normal sensor array operating occurs.

The sensor array, when interrogated provides an eight bit code via an A to D converter included in the scanner circuitry when an analog sensor array is used. That eight bit code represents the integrated light flux during the preceding on-time (integration time) for the array. Each stage of the pattern of FIG. 3 exposes the fibers of the linear entrance face of a fiber optic bundle of a scanner to light for a different length of time depending on the transparent incremental area aligned with the fiber end as the tube of FIG. 1 spins.

But the triangular opaque pattern used for an initialization procedure requires that the fibers of the linear entrance field are subjected to increasing light flux from left to right as viewed in FIG. 5.

Figure 6:
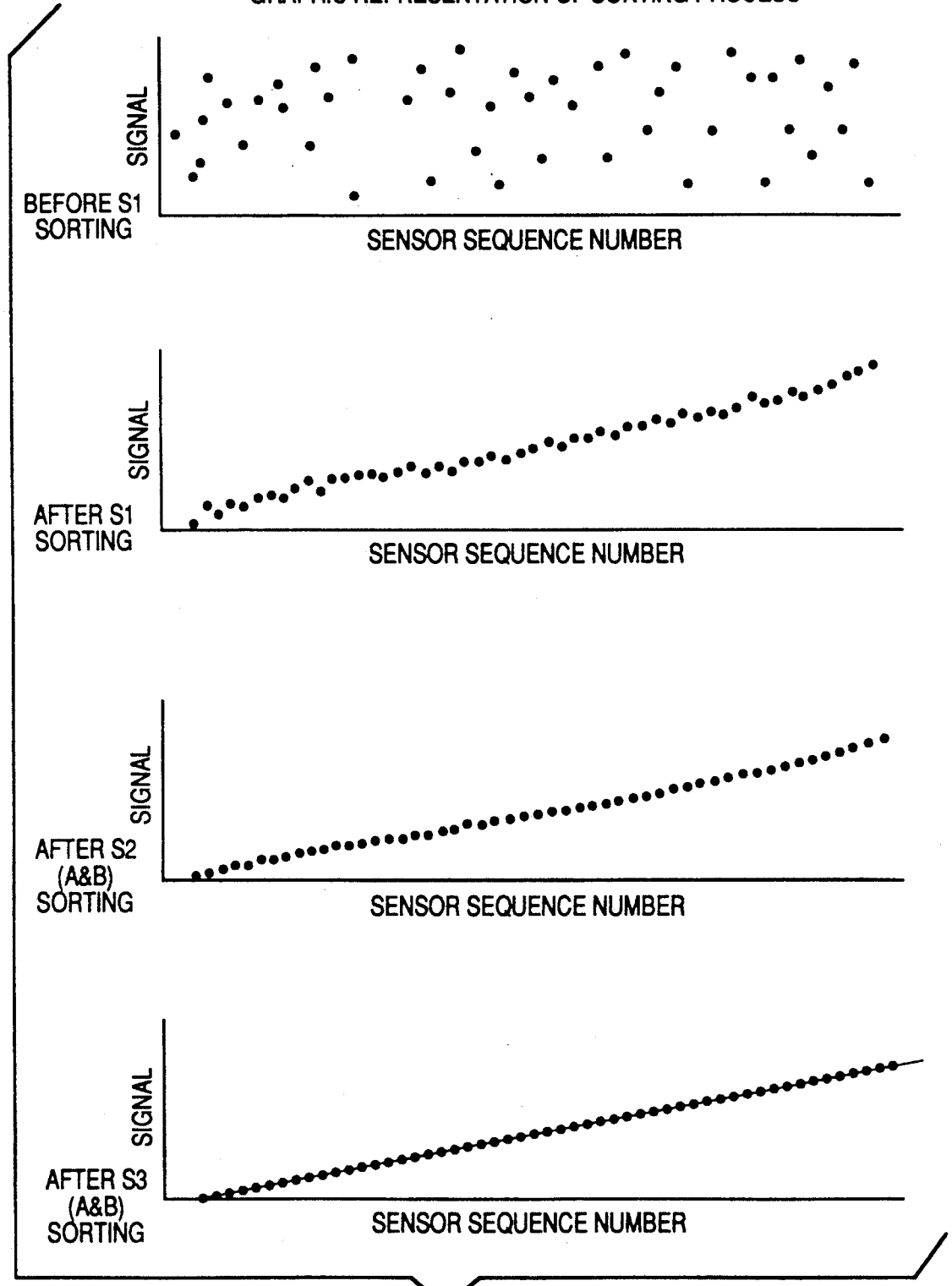

FIG. 6 shows the distribution of sensor sequence numbers as measured against light flux impinging upon each sensor of a sensor array of a scanner being initialized. The sequence number for each sensor (the abscissa) is plotted against signal strength (the ordinate) for various junctures in the initialization procedure. The top graph, as viewed in the figure, shows the distribution of sensors to be random as represented by the data in the figure.

Stage S1 sorting results in the sensor sequence being established according to increasing light flux from left to right as viewed. This is shown in the second graph from the top in FIG. 6.

The third graph down represents the sequence achieved after sorting during stage S2. The sensor sequence numbers are more clearly forming along a line representing increasing flux exposure from left to right.

The lowest graph in the figure shows the sensors (the dots) in a linear arrangement and is achieved by the sorting of stage S3 of FIG. 5. It is clear that the initialization procedure orders the sensors according to the incident light flux experienced as the tube of FIG. 1 spins and the sensor array is turned on and off in synchronism with the pattern of FIG. 5.

It might be noticed that triangle 100 appears in the pattern of FIG. 3 but not in the representation of FIG. 5. Triangle 100 is not necessary. It is used only to provide additional information as a check on the accuracy obtained during initialization and to provide a symmetry to the data obtained during stage 1 to correspond to the symmetry of the data obtained during successive stages.

It is helpful to recognize that the spatial pitch of the pattern in each stage of FIG. 5 is four times smaller than the pitch of the pattern of the next preceding stage. Thus, each successive stage provides a bigger difference in light intensity representations of $\log_2 4$ than does the pattern of the next preceding stage.

A typical sensor (say a CCD) of a sensor array supplies up to 600 light signal levels. If the scanner entrance field had only 600 fibers in it, perhaps stage S-1 alone would be able to sort the sensors according to intensity level. But because some CCD's might not provide 600 levels, because we do not want to depend on a difference of one (we may get 0.95 and lose a sensor), and because in practice we have 3400 fibers or more, we require additional stages. Stage S-1 is used to establish long term ordering over the eight and one half inch entrance field.

Each of the successive stages also provide $\log_2 4$ (i.e. two bits) which represent light intensity levels over a shorter and shorter range thus providing short range ordering. The bits provided by each stage thus provides light level indications which correspond to the representations of the chart of FIG. 6.

FIG. 3 also shows an opaque area 101 in the upper right hand corner of the FIG. Area 101 is a timing mark employed to indicate the start of the pattern for detection by photodetector 40 or an equivalent detector.

Each of the stages in the pattern of FIG. 3 used for sorting has a vertical dimension of one and three eight inches. For six stages, the pattern occupies eight and one third inches. The windowing portion of the pattern occupies about two inches. Thus, the diameter of tube 12 of FIG. 1 is about 2.3 inches allowing for simultaneous initialization of perhaps three or four scanners.

What is claimed is:

1. A combination of a tube having an axis, a first length and a periphery, said tube comprising a transparent film having said first length and being arranged to define said periphery of said tube, said film having formed hereon a multistage pattern of opaque shapes, said pattern being aligned with said axis, successive stages of said pattern having successively higher resolution to provide predictably changing different patterns of light intensities along a sequence of position defined along a linear path aligned with said axis and external to said periphery when said tube is spun about said axis, said tube having a light source positioned along the length of said axis and including a means for spinning said tube, said combination also including a fiber optic bundle having a linear face being coupled to an array of analog photo sensors, said linear face being aligned with said linear path wherein said array comprises a plurality of sensors for each fiber end in said array.

2. A combination in accordance with claim 1 in which each of said stages of said pattern includes triangular-shaped opaque regions.

3. A combination in accordance with claim 2 wherein each of said stage include first and second like patterns spatially offset from one another by 90°.

4. A combination in accordance with claim 1 including means for timing said array between each of said stages and between each spatial displacement of the pattern within a single stage.

5. A combination in accordance with claim 4 wherein said means for turning said array off comprises timing marks in said pattern and a photodetector.

6. A method of obtaining a sequence of addresses of sensors in an array of analog photosensors coupled to an area face of a fiber optic bundle, said bundle having a linear face where the sequence of pixels corresponds to the sequence of pixels in the area face, said methods comprising the steps of forming a pattern of opaque areas on a transparent medium having a width to match the width of said area face, said pattern comprising a plurality of stages each successive one of which comprises a higher resolution pattern than that of the next preceding stage, rolling said pattern into a tubular shape having an axis, generating light along said axis in a sequence of "on times", placing the linear face of a bundle to be initialized at the periphery of said tube with the area face extending radially outward and with the linear face being aligned with said axis, and spinning said tube in synchronism with said "on times", each stage of said pattern having a straight line interface between opaque and transparent areas therein, said interface being at an angle at said linear face and being operative to expose different fibers in said linear face and being operative to expose different fibers in said linear face for different exposure times during each of successive ones of said "one times."

7. The method of claim 6 wherein said method also includes the steps of interrogating an array of sensors for collecting data representative of the exposure times for sensor of said array illuminated during a preceding one of said on times, and analyzing said data for ordering said sensors according to their respective exposure time histories.

8. The method of claim 7 wherein said spinning of said tube is carried out at about 600 rpm.

9. The method of claim 7 wherein said step of generating light along said axis comprises driving a fluorescent tube with a high frequency ac current the frequency of which has no harmonic relation with 60 hertz stray magnetic fields for avoiding any standing wave or slowing drifting travelling waves along the fluorescent tube.

10. The method of claim 7 also including the step of determining the sensitivity of said sensors and excluding those sensors which exhibit sensitivities outside of a prescribed sensitivity range.

* * * * *